United States Patent
Hund et al.

(10) Patent No.: US 11,629,211 B2
(45) Date of Patent: Apr. 18, 2023

(54) ADDITIVE BASED ON WATER-SOLUBLE POLYMERS AND USES THEREOF

(71) Applicant: SNF Group, Andrezieux Boutheon (FR)

(72) Inventors: René Hund, Andrezieux Boutheon (FR); Gatien Faucher, Andrezieux Boutheon (FR); Damien Fougerouse, Andrezieux Boutheon (FR)

(73) Assignee: SNF GROUP, Andrezieux Boutheon (FR)

( * ) Notice: Subject to any disclaimer, the term of this patent is extended or adjusted under 35 U.S.C. 154(b) by 450 days.

(21) Appl. No.: 16/842,926

(22) Filed: Apr. 8, 2020

(65) Prior Publication Data

US 2020/0325263 A1 Oct. 15, 2020

(30) Foreign Application Priority Data

Apr. 10, 2019 (FR) ..................... 1903832

(51) Int. Cl.
| | |
|---|---|
| C08F 220/56 | (2006.01) |
| C08F 8/28 | (2006.01) |
| C08F 220/44 | (2006.01) |
| D21H 17/37 | (2006.01) |
| D21H 17/49 | (2006.01) |

(52) U.S. Cl.
CPC .............. C08F 220/56 (2013.01); C08F 8/28 (2013.01); C08F 220/44 (2013.01); D21H 17/375 (2013.01); D21H 17/49 (2013.01)

(58) Field of Classification Search
CPC ........ C08F 220/56; C08F 8/28; C08F 220/44; D21H 17/375; D21H 17/49
See application file for complete search history.

(56) References Cited

U.S. PATENT DOCUMENTS

| | | | |
|---|---|---|---|
| 5,753,759 A | * | 5/1998 | Hartmann ........... C09B 67/0085 525/218 |
| 8,703,847 B2 | | 4/2014 | Wright |
| 9,506,200 B2 | | 11/2016 | Hund et al. |
| 9,546,246 B2 | | 1/2017 | Hund et al. |
| 9,644,320 B2 | | 5/2017 | Wright |
| 2011/0056640 A1 | | 3/2011 | Cyr et al. |
| 2015/0053361 A1 | | 2/2015 | Hund et al. |

FOREIGN PATENT DOCUMENTS

| | | |
|---|---|---|
| FR | 3079516 A1 | 10/2019 |
| FR | 3080853 A1 | 11/2019 |
| WO | 2009059725 A2 | 5/2009 |

* cited by examiner

*Primary Examiner* — John E Uselding
(74) *Attorney, Agent, or Firm* — Heslin Rothenberg Farley & Mesiti P.C.

(57) ABSTRACT

This invention relates to an additive based on (co)polymers resulting from the reaction between at least one dialdehyde compound and at least one complex (co)polymer obtained by polymerization of water-soluble monomers in the presence of at least one host (co)polymer comprising vinylamine functions.

20 Claims, No Drawings

ADDITIVE BASED ON WATER-SOLUBLE POLYMERS AND USES THEREOF

CROSS REFERENCE TO RELATED APPLICATIONS

This application claims priority to French Application No. 1903832, filed on Apr. 10, 2019, the entire contents of which are hereby incorporated herein by reference.

FIELD OF THE INVENTION

This invention relates to an additive resulting from the reaction between at least one dialdehyde compound and at least one complex (co)polymer obtained by the polymerization of one or more monomers.

This invention also relates to a process for preparing said additive and to the uses thereof in paper manufacturing.

BACKGROUND OF THE INVENTION

In the papermaking industry, and more specifically in paper manufacturing, cellulose fibers and mineral fillers are placed in aqueous suspension before being deposited on a forming fabric so as to eliminate water and to form a mat of wet fibers which will be pressed and dried to obtain a sheet of paper.

The retention of these fibers and fillers is an important parameter for recovering as much material as possible on the forming fabric and limiting their passage through the forming fabric.

Moreover, the dewatering capacity of the fibrous mat is also a major element in papermaking processes, since an increase in the dewatering capacity makes it possible to increase the speed of the paper machine, and therefore to improve the productivity thereof. In a laboratory setting, a distinction may be made between gravity dewatering and vacuum dewatering, the latter offering a better simulation of blow boxes. This parameter increases in importance as the machines increase in speed.

In addition, papers and cards which are increasingly strong are also being sought, in particular for the packaging or fabrics industries. The increase in the mechanical strength of the sheet of paper, evaluated in the dry state or in the wet state depending on the sector of the papermaking industry in question, makes it possible to propose increased paper quality. In particular, bursting strength, resistance to compression, resistance to delamination and tensile strength in the dry or wet state may be discussed.

Document U.S. Pat. No. 9,546,246 B2 describes a complex of water-soluble polymers and also the use thereof as agent for treating mineral fillers for their implementation in the manufacture of paper. This complex makes it possible in particular to improve the retention of the mineral fillers within the fibrous mat. The increase in the content of fillers in the paper may nonetheless have a harmful impact on the mechanical strength of the paper.

Another complex (co)polymer described in patent application FR 3 080 853 A1 makes it possible to improve the dry strength properties of the paper, card or similar. This complex (co)polymer does not provide any benefit in terms of dewatering capacity.

Water-soluble polyacrylamides functionalized by a dialdehyde are widely used in paper manufacturing processes in order to increase in particular the strength of these papers in the dry state and the wet state. These water-soluble polyacrylamides may be manufactured from cationic, amphoteric or anionic polymers.

Document US 2011/0056640 describes a process for manufacturing paper using a compound resulting from the reaction between a dialdehyde and an acrylamide/diallyldimethylammonium chloride copolymer. This copolymer only improves dewatering.

Cationic or amphoteric polymers resulting from the reaction between at least one dialdehyde and at least on base (co)polymer previously modified with at least one polyethyleneimine polyfunctional compound are described in document U.S. Pat. No. 9,506,200 B2. These polymers make it possible to improve the dry strength of the paper and also the gravity dewatering of the papermaking stock. Vacuum dewatering is not mentioned in the context of this patent, however this currently represents an important feature in relation to paper machines operating at high speed.

Document U.S. Pat. No. 8,703,847 B2 described glyoxalated polymers, specifically produced at a concentration close to a concentration termed "critical", and having a viscosity of less than 30 cps. These polymers develop dry strength performance in. The dewatering performance is not mentioned.

Document U.S. Pat. No. 9,644,320 B2 describes glyoxalated polymers of low concentration, high molecular weight and high cationicity, used as dry and wet strength agent either in the pulp or on the surface of the wet or dry sheet.

A process for obtaining water-soluble anionic polymers produced by the reaction between a dialdehyde and a base anionic polymer comprising at least 5 mol % of 2-acrylamido-2-methylpropanesulfonic acid and/or a salt thereof are described in patent application FR 3 079 516 A1. A papermaking process using these water-soluble anionic polymers, making it possible to have improved performance in terms of strength in the dry state as well as in the wet state, is also described. The dewatering performance is not mentioned.

BRIEF SUMMARY OF THE INVENTION

The problem addressed by the invention is that of providing a novel additive making it possible to improve, at the same time, the vacuum dewatering properties and the strength properties in the dry state and in the wet state, without negative side effects.

DETAILED DESCRIPTION OF THE INVENTION

In the remainder of the description and in the claims, the following designations are used:
  by "base (co)polymer", the (co)polymer before the formation of the primary amine functions,
  by "host (co)polymer", the (co)polymer after the formation of the primary amine functions and before the formation of the complex (co)polymer,
  by "complex (co)polymer", the product resulting from the polymerization of water-soluble monomers in the presence of the host (co)polymer,
  by "additive": the product resulting from the reaction between at least one dialdehyde compound and at least one complex (co)polymer. "Additive" is also used to denote an agent for dry strength, retention, dewatering and runnability.

The term "water-soluble" denotes a compound (in particular a complex (co)polymer or a (co)polymer or a monomer) forming an aqueous solution without insoluble particles when it is added to water with stirring for 4 hours at 25° C. at a concentration of 20 g·L$^{-1}$.

This invention relates to an additive resulting from the reaction between at least one dialdehyde compound and at least one complex (co)polymer comprising a host polymer and one or more types of water-soluble monomers polymerized in the presence of said host polymer.

More specifically, the object of this invention relates to an additive resulting from the reaction between at least one dialdehyde compound and at least one complex (co)polymer obtained by polymerization of water-soluble monomers in the presence of at least one host (co)polymer comprising vinylamine (—$CH_2$—$CH(NH_2)$—) functions.

"Polymer" is intended to mean a homopolymer or a copolymer resulting from the polymerization of monomers that are identical or discrete, respectively. A "(co)polymer" also denotes a homopolymer or a copolymer resulting from the polymerization of monomers that are identical or discrete, respectively.

Host Polymer

The host polymer preferentially comprises primary amine functions (vinylamine) and amide functions. It is advantageously water-soluble.

The host polymer comprising vinylamine functions may result from different processes known to a person skilled in the art. It may in particular be:
  a polymer resulting from Hofmann degradation on an acrylamide base (co)polymer, or
  a polymer resulting from the total or partial hydrolysis of an N-vinylformamide base (co)polymer.

Polyvinylamines Resulting from Hofmann Degradation on a Base (Co)Polymer

Hofmann degradation is a reaction discovered by Hofmann at the end of the nineteenth century, which makes it possible to convert an amide (or even an acrylonitrile) into a primary amine by carbon dioxide elimination. The reaction mechanism is detailed below.

In the presence of a base (sodium hydroxide), a proton is removed from the amide.

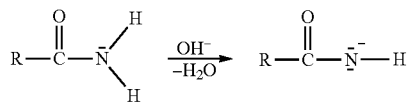

The amidate ion formed then reacts with the active chlorine ($Cl_2$) from the hypochlorite (e.g.: NaClO which is in equilibrium: 2 NaOH+$Cl_2$↔NaClO+NaCl+$H_2O$), to give an N-chloramide. The base (NaOH) removes a proton from the chloramide to form an anion. The anion loses a chloride ion to form a nitrene, which undergoes a rearrangement to give isocyanate.

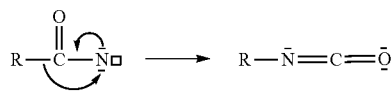

A carbamate is formed by reaction between the hydroxide ion and the isocyanate.

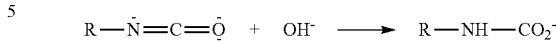

After decarboxylation (elimination of $CO_2$) from the carbamate, a primary amine is obtained:

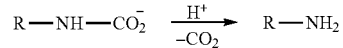

For the conversion of all or some of the amide functions of a polymer into amine functions, two main factors are involved (expressed as molar ratios). These are:
  Alpha=(alkali metal and/or alkaline earth metal hypohalite/amide),
  Beta=(alkali metal and/or alkaline earth metal hydroxide/ alkali metal and/or alkaline earth metal hypohalite).

According to a preferential embodiment, the polymer comprising vinylamine (—$CH_2$—$CH(NH_2)$—) functions results from Hofmann degradation carried out on a base (co)polymer comprising a nonionic polymer selected from the group comprising acrylamide or a derivative thereof.

Among the acrylamide derivatives, mention may be made of methacrylamide, N-isopropylacrylamide, N-methylmethacrylamide, N,N-dimethylacrylamide, N-vinylformamide, N-vinylpyrrolidone or acrylonitrile. The preferred monomer is acrylamide.

According to the invention, the proportion of acrylamide monomer or derivatives in the base (co)polymer is advantageously between 30 mol % and 100 mol %, preferably between 50 mol % and 95 mol %, and even more preferentially between 60 mol % and 90 mol % relative to the total number of monomers in the base (co)polymer.

The base (co)polymer may also further contain cationic and/or anionic monomers.

The cationic monomer(s) that can be used in the context of the invention may in particular be chosen from the quaternary ammonium salts of monomers of vinyl type, in particular acrylamide, acrylic, allylic or maleic. Mention may be made, in particular and in a non-limiting way, of quaternized dimethylaminoethyl acrylate, quaternized dimethylaminoethyl acrylate, dimethyldiallylammonium chloride (DADMAC), acrylamido propyltrimethyl ammonium chloride (APTAC) and methacrylamido propyltrimethyl ammonium chloride (MAPTAC). A preferred cationic monomer is DADMAC. The chloride anion may optionally be substituted by another halide, for example a bromide, or by another type of anion.

The quaternization of the monomers, such as DMAEA or DMAEMA, may in particular be carried out by means of an alkyl halide or an aryl halide, for example a methyl halide, advantageously methyl chloride or benzyl chloride.

According to the invention, the proportion of cationic monomer in the base (co)polymer is advantageously between 0 mol % and 70 mol %, preferably between 5 mol % and 50 mol %, and even more preferentially between 10 mol % and 40 mol % relative to the total number of monomers in the base (co)polymer.

The anionic monomer(s) that may be used within the scope of the invention may be selected from a wide group. These monomers may have vinyl, in particular acrylic, maleic, fumaric and allylic functional groups and contain a carboxylate, phosphonate, phosphate, sulfate, sulfonate group or another anionic group. The monomer may be acidic or else in the form of the corresponding alkaline earth metal, alkali metal or ammonium salt of such a monomer. Examples of suitable monomers comprise acrylic acid, methacrylic acid, itaconic acid, crotonic acid, maleic acid, fumaric acid and monomers of the strong acid type having for example a function of the sulfonic acid or phosphonic acid type, such as 2-acrylamido-2-methylpropanesulfonic acid, vinylsulfonic acid, vinylphosphonic acid, allylsulfonic acid, allylphosphonic acid, styrenesulfonic acid, and the water-soluble alkali metal, alkaline earth metal, or ammonium salts of these monomers. A preferred monomer is acrylic acid.

According to the invention, the proportion of anionic monomer in the base (co)polymer is advantageously between 0 mol % and 99 mol %, preferably between 2 mol % and 50 mol %, and even more preferentially between 5 mol % and 30 mol % relative to the total number of monomers in the base (co)polymer.

It is important to note that, in combination with these monomers, it is also possible to use water-insoluble monomers such as vinyl, in particular acrylic or allylic monomers, comprising a hydrophobic group. During their use, these monomers will be employed in very small amounts, advantageously less than 20 mol %, preferably less than 10 mol %, and they will be preferentially selected from the group comprising acrylamide derivatives such as N-alkylacrylamides (advantageously C4 to C25 alkyl), for example N-tert-butylacrylamide, octylacrylamide and also N,N-dialkylacrylamides (advantageously identical or different C4 to C25 alkyls), such as N,N-dihexylacrylamide, acrylic acid derivatives such as acrylates and methacrylates of ethoxylated or non-ethoxylated alkyls (advantageously C4 to C25 alkyls).

According to the invention, the alpha factor of the host (co)polymer resulting from the Hofmann degradation is advantageously between 0.01 and 1, preferably between 0.05 and 0.9, and even more preferentially between 0.1 and 0.8.

According to another embodiment of the invention, it is possible to use polyvinylamines obtained by Hofmann degradation carried out on a polymer comprising acrylamide or a derivative thereof and at least one polyfunctional compound containing at least 3 heteroatoms from N, O, S and P, each having at least one mobile hydrogen. The polyfunctional compound is incorporated before or during the polymerization of the monomers constituting the base (co)polymer.

Preferentially, the polyfunctional compound is selected from the group comprising polyethyleneimine, polyamine and polyallylamine Polyvinylamines Resulting from the Total or Partial Hydrolysis of an N-Vinylformamide Base (Co)Polymer In a first step, an N-vinylformamide (NVF) base (co) polymer is obtained, poly(N-vinylformamide), having the following unit:

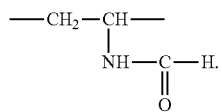

This unit is subsequently converted by hydrolysis to a primary amine, to form a poly(vinylamine):

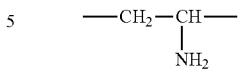

The hydrolysis can be conducted by the action of acid (acid hydrolysis) or base (basic hydrolysis).

Based on the amount of acid or base added, the N-vinylformamide base (co)polymer is partially or totally converted into poly(vinylamine).

Advantageously, the degree of hydrolysis is between 1 and 100%, more advantageously still between 30 and 90%. In other words, 30 to 90 NVF groups are converted into amine groups per 100 starting NVF groups.

Preferentially, the N-vinylformamide base (co)polymer comprises at least one nonionic monomer and/or at least one cationic monomer and/or at least one anionic monomer. The monomers that can be used within the context of the invention may be chosen from the lists mentioned above, with the nonionic monomers advantageously corresponding to acrylamide, methacrylamide, N-isopropylacrylamide, N-methylmethacrylamide, N,N-dimethylacrylamide, N-vinylformamide, N-vinylpyrrolidone and acrylonitrile.

Aside from the vinylamine function, according to a preferential embodiment, the host (co)polymer comprises at least one nonionic monomer and at least one cationic monomer. The polymer preferably comprises acrylamide and DADMAC.

According to a preferred feature of the invention, and regardless of the embodiment (Hofmann, hydrolysis of the poly(NVF) . . . ), the host (co)polymer can be linear or have a branched, star or comb structure.

The structure of the complex (co)polymer is preferably obtained during (or optionally after) the polymerization of the monomers constituting the host polymer, in the presence of a polyfunctional branching agent and optionally a transfer agent.

The branching agent may for example be selected from methylenebisacrylamide (MBA), ethylene glycol diacrylate, polyethylene glycol dimethacrylate, diacrylamide, cyanomethyl acrylate, vinyloxyethyl acrylate, vinyloxy methacrylate, triallylamine, compounds of glycidyl ether type, such as ethylene glycol diglycidyl ether, epoxys, pentaerythritol, polyvinyl alcohols, xanthates or else crosslinkers in the form of star-branched cores.

The transfer agent may be selected from polyperoxides, polyazos and polyfunctional transfer agents such as polymercaptan (co)polymers, and polyols, for instance isopropyl alcohol, sodium hypophosphite, mercaptoethanol, sodium methallylsulfonate.

In practice, the branching agent is advantageously introduced at an amount of five to fifty thousand (5 to 50,000) parts per million by weight relative to the active substance (weight of monomers constituting the host (co)polymer), preferably from 5 to 10,000 ppm, advantageously from 5 to 5000 ppm. Advantageously, the structuring agent is methylenebisacrylamide (MBA).

According to the invention, the host (co)polymer has a molecular weight of at least 10,000 g/mol, preferably at least 50,000 g/mol, and even more preferentially at least 100,000 g/mol. Its molecular weight is advantageously less than or equal to 10,000,000 g/mol, preferentially less than 5,000,000 g/mol.

The Complex (Co)Polymer

The water-soluble monomer(s) used during the preparation of the complex (co)polymer can in particular be at least one nonionic monomer and/or at least one anionic monomer and/or at least one cationic monomer. The complex (co) polymer is advantageously water-soluble.

The different monomers used may be selected from the respective lists mentioned previously in the description of the host (co)polymer.

According to a particular embodiment of the invention, the polymerization of the water-soluble monomers is carried out in the presence of at least one non-polymeric transfer agent and in the absence of branching or crosslinking agent of polyfunctional ethylene type. The transfer agent preferentially has a molecular weight advantageously less than 200 g/mol. Its molecular weight is advantageously greater than or equal to 2 g/mol.

"Branching or crosslinking agent of polyfunctional ethylene type" is used to denote agents comprising a polyvinyl group, for example a polyallylic group, in particular bifunctionalized, trifunctionalized or tetrafunctionalized.

At least one non-polymeric transfer agent used during the polymerization of the water-soluble monomer(s) is advantageously selected from the group comprising isopropyl alcohol, sodium hypophosphite, sodium (meth)allylsulfonate and mercaptoethanol.

The amount of transfer agent introduced is advantageously between 1 and 15,000 ppm, preferentially between 10 and 10,000 ppm, more preferentially between 100 and 5000 ppm by weight relative to the weight of the water-soluble monomers used.

Generally, the preparation of the complex (co)polymer of the invention does not require the development of any particular polymerization method. Indeed, this complex (co) polymer may be obtained according to any polymerization techniques well known to a person skilled in the art. This may in particular be solution polymerization, gel polymerization, precipitation polymerization, emulsion polymerization (aqueous or inverse), suspension polymerization, or micellar polymerization.

The polymerization is generally a free-radical polymerization, for example by means of UV initiators, azo initiators, redox or thermal initiators as well as controlled radical polymerization (CRP) or matrix polymerization techniques.

The Additive of Polymers

As indicated previously, the additive is the product resulting from the reaction between at least one dialdehyde compound and at least one complex (co)polymer. The additive is advantageously water-soluble.

Advantageously, the dialdehyde compound may be selected from the group comprising glyoxal, malonic dialdehyde, succinic dialdehyde, glutaraldehyde, adipic dialdehyde, 2-hydroxyadipic dialdehyde, pimelic dialdehyde, suberic dialdehyde, azelaic dialdehyde, sebacic dialdehyde, maleic dialdehyde, fumaric dialdehyde, phthalaldehyde, isophthalaldehyde, terephthalaldehyde and 1,4-diformylcyclohexane and combinations thereof.

Preferentially, the amount of dialdehyde present during the reaction is between 5% and 50%, preferentially between 10% and 40% by weight relative to the complex (co) polymer.

"Glyoxalation" is used to denote the reaction between the complex (co)polymer and the dialdehyde compound, regardless of their nature, the dialdehyde advantageously being glyoxal.

Glyoxalation does not require a particular method. The main techniques of glyoxalation known to a person skilled in the art may be used. For example, the pH may be adjusted after addition of the dialdehyde, advantageously with a solution of sodium hydroxide. It is also possible to carry out the reaction under controlled pH by the continuous addition of a base, advantageously sodium hydroxide, but also to add the dialdehyde in a plurality of fractions. The progression of the reaction may also be monitored by measuring viscosity, turbidity, etc.

According to another aspect, the invention relates to a process for preparing an additive based on polymers, comprising the following steps:
- a/ Preparation of at least one base (co)polymer composed of at least one nonionic monomer, b/ Preparation of at least one host (co)polymer obtained by what is referred to as Hofmann degradation carried out on at least one base (co)polymer obtained in step a/,
- c/ Preparation of at least one complex (co)polymer by polymerization of at least one water-soluble monomer in the presence of at least one host (co)polymer obtained in step b/,
- d/ Preparation of an additive resulting from the reaction between at least one dialdehyde compound and at least one complex (co)polymer obtained in step c/.

According to another aspect, the invention relates to a process for preparing an additive based on polymers, comprising the following steps:
- a/ Preparation of at least one N-vinylformamide base (co)polymer,
- b/ Preparation of at least one host (co)polymer obtained by at least partial hydrolysis of the N-vinylformamide (co)polymer obtained in step a/,
- c/ Preparation of at least one complex (co)polymer by polymerization of at least one water-soluble monomer in the presence of at least one host (co)polymer obtained in step b/,
- d/ Preparation of an additive resulting from the reaction between at least one dialdehyde compound and at least one complex (co)polymer obtained in step c/.

"(Co)polymer composed of at least one monomer" is used to denote a polymer obtained from a plurality of molecules of at least one monomer. Thus, a polymer of a monomer corresponds to a polymer obtained from a plurality of repeat units of molecules of a monomer.

The additive obtained according to the invention can be successfully used for the manufacture of every type of paper, card or similar requiring the use of a polymer as agent for dry strength, retention, dewatering and runnability. This can in particular be paper and card for packaging, coating support paper, sanitary paper, and domestic paper.

Runnability is used to denote the optimization of the operation of the paper machine by increasing productivity through better dewatering onto the table, better dryness at the press section, reduced breakage through increased cleanliness of the circuits, and reduced deposits.

The additive of the invention in particular enables a significant gain in productivity of the paper machines on which this additive would be used. It further makes it possible to obtain better vacuum dewatering properties and strength properties in the dry state and in the wet state, all without negative side effects.

According to the invention, the additive is added into the process before or after formation of the sheet. Thus, the cellulose material can be brought into contact with the additive in different ways. The additive can be used in the form of a diluted or undiluted aqueous solution. The additive may be added to the cellulose material. It may be applied by an impregnation technique, or may be directly added into the fibrous suspension at any point in the paper manufacturing process at which dry strength agents are customarily introduced.

It may be introduced into the thick stock or into the thin stock. It may be added at the fan pump or the headbox. The additive is preferentially introduced before the headbox.

It can also be applied at the forming table, for example by spray, or using the coating machine.

The additive can be incorporated or applied with conventional means known to a person skilled in the art.

The additive is preferentially industrially injected into the fibrous suspension, i.e. before it is diluted by the white water (thick stock). The concentration of the pulp is advantageously approximately 3% to 5% by weight.

The process can be used with pulps of virgin fibers (Kraft, bisulfite, etc.), pulps of recycled fibers, deinked pulps, mechanical pulps or thermomechanical pulps.

The additive can preferably be prepared in the vicinity of the paper machine.

The invention and resulting advantages will become clear from the following exemplary embodiments.

EXAMPLES

All the viscosities are measured with a Brookfield viscometer fitted with an LV1 module. The measurements are performed at a rotational speed of 60 rpm.

Example 1 (According to the Invention)

Synthesis of the Complex Copolymer 1

38.1 g of host polymer (commercial product Floret HF31 (SNF SA), active matter=10.5% by weight in water, dry matter=21%, i.e. 4 g of host polymer) are introduced into a 1-liter reactor fitted with a mechanical stirrer, a thermometer, a condenser and a gaseous nitrogen dipstick. 559 g of water, 254.9 g of 50% acrylamide (solution at 50% by weight in water) and 145.4 g of 50% AMPS (solution at 50% by weight in water), and also 0.67 g of chain transfer agent (sodium hypophosphite) (AMPS=2-acrylamido-2-methylpropanesulfonic acid), are added. The pH of the reaction medium is adjusted to 4.1 using sulfuric acid. The temperature is adjusted to 21° C. and the catalysts are then injected into the reaction medium, i.e. 0.31 g of sodium persulfate, 0.41 g of sodium metabisulfite and 0.01 g of Mohr's salt. By virtue of the reaction exothermy, the temperature of the reaction medium increases up to the temperature of 62.1° C. After 45 minutes of aging, 2.5 g of sodium bisulfite (solution at 40% by weight in water) are added to cause any residual monomers to react. Another aging of 45 minutes is applied before cooling. The solution of complex polymer 1 obtained has a pH of 4.1, a solids content of 20.2% and a viscosity of 1200 cps.

In examples 1 to 4, the product Floret HF31 corresponds to the copolymer resulting from the Hofmann degradation of a DADMAC/AM copolymer (30/70 mol %) with an alpha factor=0.7 (AM=acrylamide).

Synthesis of the Additive 1

241.4 g of complex copolymer 1 and 539.3 g of water are introduced into a 1-liter reactor fitted with a mechanical stirrer. The reactor is provided with a pH probe. After 10 minutes of stirring, the pH is adjusted to 11.1 with a solution of sodium hydroxide at 10% by weight in water. The temperature is kept between 20 and 22° C. 19.3 g of glyoxal at 40% by weight in water are added. The control of the pH and the monitoring of the viscosity make it possible to obtain a 65 cps product. The reaction is stopped by lowering the pH to less than 3.5 by adding $H_2SO_4$ at 92% in water, to obtain the additive 1.

Example 2 (According to the Invention)

Synthesis of the Complex Copolymer 2

38.1 g of host polymer (commercial product Floret HF31 (SNF SA), active matter=10.5% by weight in water, dry matter=21%) are introduced into a 1-liter reactor fitted with a mechanical stirrer, a thermometer, a condenser and a gaseous nitrogen dipstick. 481.3 g of water and 33.4 g of diallyldimethylammonium chloride (DADMAC, 64% by weight in water) are added. The pH is adjusted to 2.5 with $H_2SO_4$. The medium is heated and kept at a temperature of between 79 and 81° C. using a water bath. Using two continuous pours, 357.2 g of 50% acrylamide (solution at 50% by weight) and 0.67 g of chain transfer agent (sodium hypophosphite) are incorporated with continuous pouring for 90 minutes and a solution of sodium persulfate is incorporated over 90 minutes. After 30 minutes of aging, 0.26 g of sodium bisulfite (solution at 40% by weight in water) are added to cause any residual monomers to react. Another aging of 60 minutes is applied before cooling. The solution of complex copolymer 2 obtained has a pH of 5.0, a solids content of 19.6% and a viscosity of 900 cps.

Synthesis of the Additive 2a 160 g of complex copolymer 2 and 620 g of water are introduced into a 1-liter reactor fitted with a mechanical stirrer. The reactor is provided with a pH probe. After 10 minutes of stirring, the pH is adjusted to 10.3 with a solution of sodium hydroxide at 10% by weight in water. The temperature is kept between 20 and 22° C. 20.0 g of glyoxal at 40% by weight in water are added. The control of the pH and the monitoring of the viscosity make it possible to obtain a 49 cps product. The reaction is stopped by lowering the pH to less than 3.5 by adding $H_2SO_4$ at 92% in water, to obtain the additive 2a.

Synthesis of the Additive 2b 69.6 g of complex copolymer 2 and 725.2 g of water are introduced into a 1-liter reactor fitted with a mechanical stirrer. The reactor is provided with a pH probe. After 10 minutes of stirring, the pH is adjusted to 10.38 with a solution of sodium hydroxide at 10% by weight in water. The temperature is kept between 20 and 22° C. 5.22 g of glyoxal at 40% by weight in water are added. The control of the pH and the monitoring of the viscosity make it possible to obtain a 38 cps product. The reaction is stopped by lowering the pH to less than 3.5 by adding $H_2SO_4$ at 92% in water, to obtain the additive 2b.

Example 3 (According to the Invention)

Synthesis of the Complex Copolymer 3

38.1 g of host polymer (commercial product Floret HF31 (SNF SA), active matter=10.5% by weight in water, dry matter=21%) are introduced into a 1-liter reactor fitted with a mechanical stirrer, a thermometer, a condenser and a gaseous nitrogen dipstick. 565.9 g of water, 113.3 g of diallyldimethylammonium chloride (DADMAC, 64% by weight in water) are added. The pH is adjusted to 2.5 with $H_2SO_4$. The medium is heated and kept at a temperature of between 79 and 81° C. using a water bath. Using two continuous pours, 255 g of 50% acrylamide (solution at 50% by weight in water) and 0.07 g of chain transfer agent (sodium hypophosphite) are incorporated with continuous pouring for 90 minutes and a solution of sodium persulfate is incorporated over 90 minutes. After 30 minutes of aging, 0.26 g of sodium bisulfite (solution at 40% by weight in water) are added to cause any residual monomers to react. Another aging of 60 minutes is applied before cooling. The solution of complex copolymer 3 obtained has a pH of 5.0, a solids content of 19.7% and a viscosity of 2000 cps.

Synthesis of the Additive 3a 256.8 g of complex copolymer 3 and 521.6 g of water are introduced into a 1-liter reactor fitted with a mechanical stirrer. The reactor is provided with a pH probe. After 10 minutes of stirring, the pH is adjusted to 10.6 with a solution of sodium hydroxide at 10% by weight in water. The temperature is kept between 20 and 22° C. 21.6 g of glyoxal at 40% by weight in water are added. The control of the pH and the monitoring of the viscosity make it possible to obtain a 97 cps product. The reaction is stopped by lowering the pH to less than 3.5 by adding $H_2SO_4$ at 92% in water, to obtain the additive 3a.

Synthesis of the Additive 3b 69.6 g of complex copolymer 3 and 725.2 g of water are introduced into a 1-liter reactor fitted with a mechanical stirrer. The reactor is provided with a pH probe. After 10 minutes of stirring, the pH is adjusted to 10.4 with a solution of sodium hydroxide at 10% by weight in water. The temperature is kept between 20 and 22° C. 5.22 g of glyoxal at 40% by weight in water are added. The control of the pH and the monitoring of the viscosity make it possible to obtain an 18 cps product. The reaction is stopped by lowering the pH to less than 3.5 by adding $H_2SO_4$ at 92% in water, to obtain the additive 3b.

Example 4 (According to the Invention)

Synthesis of the Complex Copolymer 4

38.1 g of host polymer (commercial product Floret HF31 (SNF SA), active matter=10.5% by weight in water, dry matter=21%) are introduced into a 1-liter reactor fitted with a mechanical stirrer, a thermometer, a condenser and a gaseous nitrogen dipstick. 584.5 g of water and 89.5 g of diallyldimethylammonium chloride (DADMAC, 64% by weight in water) are added. The pH is adjusted to 2.5 with $H_2SO_4$. The medium is heated and kept at a temperature of between 79 and 81° C. using a water bath. Using two continuous pours, 285.4 g of 50% acrylamide (solution at 50% by weight in water) and 0.07 g of chain transfer agent (sodium hypophosphite) are incorporated with continuous pouring for 90 minutes and a solution of sodium persulfate is incorporated over 90 minutes. After 30 minutes of aging, 0.26 g of sodium bisulfite (solution at 40% by weight in water) are added to cause any residual monomers to react. Another aging of 60 minutes is applied before cooling. The solution of complex copolymer 4 obtained has a pH of 4.7, a solids content of 20.6% and a viscosity of 3500 cps.

Synthesis of the Additive 4

69.6 g of complex copolymer 4 and 725.2 g of water are introduced into a 1-liter reactor fitted with a mechanical stirrer. The reactor is provided with a pH probe. After 10 minutes of stirring, the pH is adjusted to 10.4 with a solution of sodium hydroxide at 10% by weight in water. The temperature is kept between 20 and 22° C. 5.22 g of glyoxal at 40% by weight in water are added.

The control of the pH and the monitoring of the viscosity make it possible to obtain a 54 cps product. The reaction is stopped by lowering the pH to less than 3.5 by adding $H_2SO_4$ at 92% in water, to obtain the additive 4.

Example 5 (According to the Invention)

Synthesis of the Complex Copolymer 5

The protocol for synthesis of the complex copolymer 4 is repeated, but the amount of host polymer introduced is 95.2 g.

The solution of complex copolymer 5 obtained has a pH of 4.8, a solids content of 20.7% and a viscosity of 2100 cps.

Synthesis of the Additive 5

The protocol for synthesis of the additive 4 is repeated, replacing the complex copolymer 4 with the complex copolymer 5.

The control of the pH and the monitoring of the viscosity make it possible to obtain a 35 cps product. The reaction is stopped by lowering the pH to less than 3.5 by adding $H_2SO_4$ at 92% in water, to obtain the additive 5.

Example 6 (According to the Invention)

Synthesis of the Complex Copolymer 6

The protocol for synthesis of the complex copolymer 4 is repeated, but the amount of host polymer introduced is 190.5 g.

The solution of complex copolymer 6 obtained has a pH of 5.0, a solids content of 20.5% and a viscosity of 3500 cps.

Synthesis of the Additive 6

The protocol for synthesis of the additive 4 is repeated, replacing the complex copolymer 4 with the complex copolymer 6.

The control of the pH and the monitoring of the viscosity make it possible to obtain a 38 cps product. The reaction is stopped by lowering the pH to less than 3.5 by adding $H_2SO_4$ at 92% in water, to obtain the additive 6.

Example 7 (Counter-Example)

Synthesis of the Copolymer 1

597.1 g of water, 254.9 g of 50% acrylamide (solution at 50% by weight in water) and 145.4 g of 50% AMPS (solution at 50% by weight in water), and also 0.67 g of chain transfer agent (sodium hypophosphite) are introduced into a 1-liter reactor fitted with a mechanical stirrer, a thermometer, a condenser and a gaseous nitrogen dipstick.

The pH of the reaction medium is adjusted to 4.1 using sulfuric acid. The temperature is adjusted to 21° C. and the catalysts are then injected into the reaction medium, i.e. 0.31 g of sodium persulfate, 0.41 g of sodium metabisulfite and 0.01 g of Mohr's salt. By virtue of the reaction exothermy, the temperature of the reaction medium increases up to the temperature of 62.2° C. After 45 minutes of aging, 2.5 g of sodium bisulfite (solution at 40% by weight in water) are added to cause any residual monomers to react. Another aging of 45 minutes is applied before cooling. The solution of copolymer 1 obtained has a pH of 4.1, a solids content of 20.1% and a viscosity of 700 cps.

Synthesis of the Glyoxalated Copolymer 1

241.4 g of copolymer 1 and 539.3 g of water are introduced into a 1-liter reactor fitted with a mechanical stirrer. The reactor is provided with a pH probe. After 10 minutes of stirring, the pH is adjusted to 11.12 with a solution of sodium hydroxide at 10% by weight in water. The temperature is kept between 20 and 22° C. 19.3 g of glyoxal at 40% by weight in water are added. The control of the pH and the monitoring of the viscosity make it possible to obtain a 52.5 cps product. The reaction is stopped by lowering the pH to less than 3.5 by adding $H_2SO_4$ at 92% in water, to obtain the glyoxalated copolymer 1. The glyoxalated copolymer 1 corresponds to the prior art FR 3 079 516 A1.

Example 8 (Counter-Example)

Synthesis of the Copolymer 2

519.4 g of water, 33.4 g of diallyldimethylammonium chloride (DADMAC, 64% by weight in water) are introduced into a 1-liter reactor fitted with a mechanical stirrer, a thermometer, a condenser and a gaseous nitrogen dipstick. The pH is adjusted to 2.5 with $H_2SO_4$. The medium is heated and kept at a temperature of between 79 and 81° C. using a water bath. Using two continuous pours, 357.2 g of 50% acrylamide (solution at 50% by weight in water) are incorporated with continuous pouring for 90 minutes and a solution of sodium persulfate is incorporated over 90 minutes. 1 g of chain transfer agent (sodium hypophosphite) is then added, and after 30 minutes of aging, 0.26 g of sodium bisulfite (solution at 40% by weight in water) are added to cause any residual monomers to react. Another aging of 60 minutes is applied before cooling. The solution of copolymer 2 obtained has a pH of 5.0, a solids content of 19.5% and a viscosity of 1100 cps.

Synthesis of the Glyoxalated Copolymer 2a 160 g of copolymer 2 and 620 g of water are introduced into a 1-liter reactor fitted with a mechanical stirrer. The reactor is provided with a pH probe. After 10 minutes of stirring, the pH is adjusted to 10.2 with a solution of sodium hydroxide at 10% by weight in water. The temperature is kept between 20 and 22° C. 20.0 g of glyoxal at 40% by weight in water are added. The control of the pH and the monitoring of the viscosity make it possible to obtain a 50 cps product. The reaction is stopped by lowering the pH to less than 3.5 by adding $H_2SO_4$ at 92% in water, to obtain the glyoxalated copolymer 2a.

Synthesis of the Glyoxalated Copolymer 2b 69.6 g of copolymer 2 and 725.2 g of water are introduced into a 1-liter reactor fitted with a mechanical stirrer. The reactor is provided with a pH probe. After 10 minutes of stirring, the pH is adjusted to 10.38 with a solution of sodium hydroxide at 10% by weight in water. The temperature is kept between 20 and 22° C. 5.22 g of glyoxal at 40% by weight in water are added. The control of the pH and the monitoring of the viscosity make it possible to obtain a 15 cps product. The reaction is stopped by lowering the pH to less than 3.5 by adding $H_2SO_4$ at 92% in water, to obtain the glyoxalated copolymer 2b. The glyoxalated copolymer 2b corresponds to the prior art U.S. Pat. No. 8,703,847.

Producing the Mixture 2

38.1 g of host polymer (commercial product HF31 (SNF Floerger), active matter=10.5% by weight in water, dry matter=21%) and 911 g of the copolymer 2 synthesized above are mixed in a 1-liter reactor fitted with a mechanical stirrer. A mixture having a pH of 4.5, a solids content of 19.1% and a viscosity of 950 cps is obtained.

Synthesis of the Glyoxalated Mixture 2b 69.6 g of mixture 2 and 725.2 g of water are introduced into a 1-liter reactor fitted with a mechanical stirrer. The reactor is provided with a pH probe. After 10 minutes of stirring, the pH is adjusted to 10.38 with a solution of sodium hydroxide at 10% by weight in water. The temperature is kept between 20 and 22° C. 5.22 g of glyoxal at 40% by weight in water are added. The control of the pH and the monitoring of the viscosity make it possible to obtain a product having a viscosity of 40 cps. The reaction is stopped by lowering the pH to less than 3.5 by adding $H_2SO_4$ at 92% in water, to obtain the glyoxalated mixture 2b. The glyoxalated mixture 2b corresponds to the prior art WO 2009/059725.

Example 9 (Counter-Example)

Synthesis of the Copolymer 3

605 g of water, 113.3 g of diallyldimethylammonium chloride (DADMAC, 64% by weight in water) and 16 g of polyethyleneimine are introduced into a 1-liter reactor fitted with a mechanical stirrer, a thermometer, a condenser and a gaseous nitrogen dipstick. The pH is adjusted to 2.5 with $H_2SO_4$. The medium is heated and kept at a temperature of between 79 and 81° C. using a water bath. Using two continuous pours, 255 g of 50% acrylamide (solution at 50% by weight in water), 0.2 g of methylenebisacrylamide and 0.08 g of sodium hypophosphite are incorporated with continuous pouring for 90 minutes and a solution of sodium persulfate is incorporated over 90 minutes. 1 g of chain transfer agent (sodium hypophosphite) is then added, and after 30 minutes of aging, 0.26 g of sodium bisulfite (solution at 40% by weight in water) are added to cause any residual monomers to react. Another aging of 60 minutes is applied before cooling. The solution of copolymer 3 obtained has a pH of 4.1, a solids content of 20.9% and a viscosity of 2050 cps.

Synthesis of the Glyoxalated Copolymer 3a 260.9 g of copolymer 3 and 519.6 g of water are introduced into a 1-liter reactor fitted with a mechanical stirrer. The reactor is provided with a pH probe. After 10 minutes of stirring, the pH is adjusted to 10.2 with a solution of sodium hydroxide at 10% by weight in water. The temperature is kept between 20 and 22° C. 19.57 g of glyoxal at 40% by weight in water are added. The control of the pH and the monitoring of the viscosity make it possible to obtain a 95 cps product. The reaction is stopped by lowering the pH to less than 3.5 by adding $H_2SO_4$ at 92% in water, to obtain the glyoxalated copolymer 3a. The glyoxalated copolymer 3 corresponds to the prior art FR 2 987 375.

Synthesis of the Glyoxalated Copolymer 3b 69.6 g of copolymer 3 and 725.2 g of water are introduced into a 1-liter reactor fitted with a mechanical stirrer. The reactor is provided with a pH probe. After 10 minutes of stirring, the pH is adjusted to 10.5 with a solution of sodium hydroxide at 10% by weight in water. The temperature is kept between 20 and 22° C. 5.22 g of glyoxal at 40% by weight in water are added. The control of the pH and the monitoring of the viscosity make it possible to obtain a 55 cps product. The reaction is stopped by lowering the pH to less than 3.5 by adding $H_2SO_4$ at 92% in water, to obtain the glyoxalated copolymer 3b.

Example 10 (Counter-Example)

Synthesis of the Copolymer 4

621 g of water, 89.5 g of diallyldimethylammonium chloride (DADMAC, 64% by weight in water) are introduced into a 1-liter reactor fitted with a mechanical stirrer, a thermometer, a condenser and a gaseous nitrogen dipstick. The pH is adjusted to 2.5 with $H_2SO_4$. The medium is heated and kept at a temperature of between 79 and 81° C. using a water bath. Using two continuous pours, 285.4 g of 50% acrylamide (solution at 50% by weight in water) are incorporated with continuous pouring for 90 minutes and a solution of sodium persulfate is incorporated over 90 minutes. 1 g of chain transfer agent (sodium hypophosphite) is then added, and after 30 minutes of aging, 0.26 g of sodium bisulfite (solution at 40% by weight in water) are added to cause any residual monomers to react. Another aging of 60 minutes is applied before cooling. The solution of copolymer 4 obtained has a pH of 4.9, a solids content of 20.5% and a viscosity of 1700 cps.

Synthesis of the Glyoxalated Copolymer 4

69.6 g of copolymer 4 and 725.2 g of water are introduced into a 1-liter reactor fitted with a mechanical stirrer. The reactor is provided with a pH probe. After 10 minutes of stirring, the pH is adjusted to 10.4 with a solution of 10% sodium hydroxide. The temperature is kept between 20 and 22° C. 5.22 g of glyoxal at 40% by weight in water are added. The control of the pH and the monitoring of the viscosity make it possible to obtain a 53 cps product. The reaction is stopped by lowering the pH to less than 3.5 by adding $H_2SO_4$ at 92% in water, to obtain the glyoxalated copolymer 4. The glyoxalated copolymer 4 corresponds to the prior art U.S. Pat. No. 9,644,320.

Procedures for Evaluation Tests

Recycled Fiber Pulp (Used in All the Application Examples)

Wet pulp is obtained by pulping dry pulp in order to obtain a final aqueous concentration of 1% by mass. This is a pulp with neutral pH composed of 100% recycled board fibers.

Evaluation of the Vacuum Dewatering Performance (DDA)

The DDA (Dynamic Drainage Analyzer) makes it possible to automatically determine the amount of time (in seconds) necessary to dewater a fibrous suspension under vacuum. The polymers are added to the wet pulp (0.6 liter of pulp at 1.0% by mass in water) in the DDA cylinder under stirring at 1000 rpm:
T=0 s: start of stirring the pulp
T=10 s: addition of the additive
T=30 s: stirring stopped and dewatering under vacuum at 200 mbar for 60 s The pressure under the wire is recorded as a function of time. When all the water is evacuated from the fibrous web, air passes through it causing a break in the slope of the curve showing the pressure under the wire as a function of time. The time, expressed in seconds, at this break in the slope, corresponds to the dewatering time. The lower the time, the better the dewatering under vacuum.

Manufacture of Handsheets, Grammage of 90 $g \cdot m^{-2}$

The quantity of pulp necessary is sampled so as to obtain a sheet with a grammage of 90 $g \cdot m^{-2}$.

The wet pulp is introduced into the dynamic handsheet former and is maintained under stirring. The various components of the system are injected into this pulp according to the predefined sequence. Generally, a contact time of 45 seconds between each addition of polymer is maintained.

Paper handsheets are made with an automatic handsheet former: a blotter and the forming wire are placed in the jar of the dynamic handsheet former before starting rotation of the jar at 1000 rpm and constructing the water wall. The treated pulp is distributed over the water wall to form the fibrous sheet on the forming wire.

Once the water has been drained, the fibrous sheet is collected, pressed under a press delivering 4 bars, then dried at 117° C. The sheet obtained is conditioned overnight in a controlled temperature and humidity room (50% relative humidity and 23° C.). The mechanical strength properties of all the sheets obtained by this procedure are then measured.

Mechanical Strength Performance of the Paper

The bursting is measured with a Messmer Buchel M 405 bursting meter according to standard TAPPI T403 om-02. The result is expressed in kPa. The burst index, expressed in $kPa \cdot m^2/g$, is determined by dividing this value by the grammage of the sheet tested.

The breaking lengths in the dry state and in the wet state are measured in the machine direction with a Testometric AX traction device according to standard TAPPI T494 om-01. The result is expressed in km.

Regardless of the characteristics being evaluated, a percentage improvement in performance is expressed for each polymer relative to the same conditions without addition of said polymer.

The polymers evaluated below are dosed at an amount of 1.5 kg/t of active polymer relative to the dry fibers.

In the case of anionic polymers, said polymers are tested in combination with, beforehand, PAE (polyamidoamine epichlorohydrin) dosed at 3 kg/t of dry matter relative to the dry fibers.

TABLE 1 comparison between complex copolymers and additives according to the invention

| Product | Ionicity (mol %) | DDA | Burst index | Dry breaking length (running direction) | Wet breaking length (running direction) |
|---|---|---|---|---|---|
| Complex polymer 1 | −15 | 2.4 | 12.4 | 9.6 | 23.5 |
| Additive 1 | −15 | 35.4 | 23.7 | 13.5 | 52.9 |
| Complex polymer 2 | 5 | 3.0 | 5.5 | 2.2 | — |
| Additive 2a | 5 | 18.0 | 16.3 | 12.9 | — |
| Additive 2b | 5 | 22.9 | 23.5 | 15.1 | — |
| Complex polymer 3 | 20 | 6.4 | 7.3 | 3.7 | — |
| Additive 3a | 20 | 28.7 | 20.8 | 14.0 | — |
| Additive 3b | 20 | 57.6 | 32.1 | 16.2 | — |

It is clearly demonstrated in table 1 that the additives according to the invention, corresponding to the glyoxalation of a complex copolymer, regardless of their concentrations, provide an improvement in the vacuum dewatering performance and also the physical properties of the paper (burst index and breaking lengths in the dry state and in the wet state), compared to the complex polymer that has not undergone glyoxalation.

TABLE 2 comparison for equal anionicity at 15 mol % between an additive and a glyoxalated copolymer based on a linear copolymer

| Product | DDA | Burst index | Dry breaking length (running direction) | Wet breaking length (running direction) |
|---|---|---|---|---|
| Additive 1 | 35.4 | 23.7 | 13.5 | 52.9 |
| Glyoxalated copolymer 1 | 34.8 | 22.1 | 13.1 | 51.0 |

TABLE 3 comparison for equal cationicity at 5 mol % between an additive according to the invention, a glyoxalated copolymer based on a linear copolymer, and a product resulting from the glyoxalation of the corresponding mixture.

| Product | DDA | Burst index | Dry breaking length (running direction) |
|---|---|---|---|
| Additive 2a | 18.0 | 16.3 | 12.9 |
| Additive 2b | 22.9 | 23.5 | 15.1 |
| Glyoxalated copolymer 2a | 15.2 | 15.4 | 12.5 |
| Glyoxalated copolymer 2b | 18.9 | 18.1 | 10.8 |
| Glyoxalated mixture 2b | 18.6 | 18.3 | 10.6 |

TABLE 4 comparison for equal cationicity at 20 mol % between additives according to the invention and glyoxalated copolymers based on a conventional linear copolymer

| Product | DDA | Burst index | Dry breaking length (running direction) |
|---|---|---|---|
| Additive 3a | 28.7 | 20.8 | 14.0 |
| Additive 3b | 57.6 | 32.1 | 16.2 |
| Glyoxalated copolymer 3a | 26.8 | 19.4 | 13.1 |
| Glyoxalated copolymer 3b | 54.0 | 28.0 | 13.6 |

It is clearly established in tables 2, 3 and 4 that the additives of the invention, with all else being otherwise equal (glyoxalation concentration, ionicity), provide a benefit in terms of vacuum dewatering performance and also mechanical properties of the paper (burst index, breaking length in the dry state and in the wet state) compared to the glyoxalated copolymers resulting from conventional linear copolymers, or conventional branched copolymers modified beforehand with a polyethyleneimine, or to the product of glyoxalation of the corresponding mixture.

TABLE 5 comparison for equal cationicity at 15 mol % between additives according to the invention and a glyoxalated copolymer based on a linear copolymer

| Product | % of host polymer | DDA | Burst index | Dry breaking length (running direction) |
|---|---|---|---|---|
| Additive 4 | 2% | 44.8 | 27.1 | 12.3 |
| Additive 5 | 5% | 45.4 | 29.4 | 13.8 |
| Additive 6 | 10% | 46.6 | 30.7 | 15.3 |
| Glyoxalated copolymer 4 | Linear (0%) | 41.5 | 24.9 | 10.6 |

In table 5, the technical effect provided by the invention in terms of vacuum dewatering and mechanical strength performance of the sheet of paper (burst and breaking length in the dry state) is readily observed. Indeed, the gains in performance are increasingly pronounced with increasing amounts of host polymer in the complex copolymer.

The invention claimed is:

1. An additive based on (co)polymers resulting from the reaction between at least one dialdehyde compound and at least one complex (co)polymer obtained by polymerization of water-soluble monomers in the presence of at least one host (co)polymer comprising vinylamine functions.

2. The additive according to claim 1, wherein the at least one dialdehyde is selected from glyoxal, malonic dialdehyde, succinic dialdehyde, glutaraldehyde, adipic dialdehyde, 2-hydroxyadipic dialdehyde, pimelic dialdehyde, suberic dialdehyde, azelaic dialdehyde, sebacic dialdehyde, maleic dialdehyde, fumaric dialdehyde, phthalic dialdehyde, isophthalic dialdehyde, terephthalic dialdehyde and 1,4-diformylcyclohexane and combinations thereof.

3. The additive according to claim 1, wherein the polymerization of the at least one water-soluble monomer is carried out in the presence of at least one non-polymeric transfer agent and in the absence of branching or crosslinking agent of polyfunctional ethylene type.

4. The additive according to claim 3, wherein the at least one non-polymeric transfer agent has a molecular weight of less than 200 g/mol.

5. The additive according to claim 3, wherein the at least one non-polymeric transfer agent is selected from the group consisting of isopropyl alcohol, sodium hypophosphite and mercaptoethanol.

6. The additive according to claim 1, wherein the at least one host (co)polymer comprising vinylamine functions results from the hydrolysis of an N-vinylformamide base (co)polymer.

7. The additive according to claim 1, wherein the at least one host (co)polymer comprising vinylamine functions results from a Hofmann degradation reaction on a base (co)polymer.

8. The additive according to claim 7, wherein the base (co)polymer comprises at least one nonionic polymer selected from the group consisting of acrylamide and derivatives thereof.

9. The additive according to claim 1, wherein the monomers constituting the at least one host (co)polymer and the water-soluble monomer(s) are selected from the group consisting of:
   at least one monomer selected from the group consisting of acrylamide, methacrylamide, N-isopropylacrylamide, N-methylmethacrylamide, N,N-dimethylacrylamide, N-vinylformamide, N-vinylpyrrolidone and acrylonitrile; and/or
   at least one monomer selected from the group consisting of quaternary ammonium salts of dimethylaminoethyl acrylate (DMAEA), quaternary ammonium salts of dimethylaminoethyl methacrylate (DMAEMA), diallyldimethylammonium chloride (DADMAC), acrylamidopropyltrimethyl ammonium chloride (APTAC) and methacrylamidopropyltrimethylammonium chloride (MAPTAC); and/or
   at least one monomer selected from the group consisting of acrylic acid, methacrylic acid, itaconic acid, crotonic acid, maleic acid, fumaric acid, 2-acrylamido2-methylpropanesulfonic acid, vinylsulfonic acid, vinylphosphonic acid, allylsulfonic acid, allylphosphonic acid, styrenesulfonic acid, the water-soluble salts of an alkali metal, of an alkaline-earth metal or of ammonium of these monomers.

10. A process for preparing an additive based on polymers, comprising the following steps:
   a. preparing at least one base (co)polymer composed of at least one nonionic monomer,
   b. preparing at least one host (co)polymer obtained by what is referred to as Hofmann degradation carried out on at least one base (co)polymer obtained in step a,
   c. preparing at least one complex (co)polymer by polymerization of water-soluble monomers in the presence of at least one host (co)polymer obtained in step b,
   d. preparing an additive resulting from the reaction between at least one dialdehyde and at least one complex (co)polymer obtained in step c.

11. A process for preparing an additive based on polymers, comprising the following steps:
   a. preparing at least one N-vinylformamide base (co)polymer,
   b. preparing at least one host (co)polymer obtained by at least partial hydrolysis of the N-vinylformamide (co)polymer obtained in step a,
   c. preparing at least one complex (co)polymer by polymerization of water-soluble monomers in the presence of at least one host (co)polymer obtained in step b,
   d. preparing an additive resulting from the reaction between at least one dialdehyde and at least one complex (co)polymer obtained in step c.

12. A process for manufacturing a sheet of paper or card, according to which, before formation of said sheet, at least one additive according to claim 1 is added to a fibrous suspension at one or more injection points.

13. The additive according to claim 2, wherein the polymerization of the at least one water-soluble monomer is carried out in the presence of at least one non-polymeric transfer agent and in the absence of branching or crosslinking agent of polyfunctional ethylene type.

14. The additive according to claim 13, wherein the at least one non-polymeric transfer agent is selected from the group consisting of isopropyl alcohol, sodium hypophosphite and mercaptoethanol.

15. The additive according to claim 4, wherein the at least one non-polymeric transfer agent is selected from the group consisting of isopropyl alcohol, sodium hypophosphite and mercaptoethanol.

16. The additive according to claim 5, wherein the at least one host (co)polymer comprising vinylamine functions results from the hydrolysis of an N-vinylformamide base (co)polymer.

17. The additive according to claim 16, wherein the at least one non-polymeric transfer agent has a molecular weight of less than 200 g/mol.

18. The additive according to claim 5, wherein the at least one host (co)polymer comprising vinylamine functions results from a Hofmann degradation reaction on a base (co)polymer.

19. The additive according to claim 18, wherein the at least one non-polymeric transfer agent has a molecular weight of less than 200 g/mol.

20. The additive according to claim 5, wherein the monomers constituting the at least one host (co)polymer and the water-soluble monomer(s) are selected from the group consisting of:
   at least one monomer selected from the group consisting of acrylamide, methacrylamide, N-isopropylacrylamide, N-methylmethacrylamide, N,N-dimethylacrylamide, N-vinylformamide, N-vinylpyrrolidone and acrylonitrile; and/or
   at least one monomer selected from the group consisting of quaternary ammonium salts of dimethylaminoethyl acrylate (DMAEA), quaternary ammonium salts of dimethylaminoethyl methacrylate (DMAEMA), diallyldimethylammonium chloride (DADMAC), acrylamidopropyltrimethyl ammonium chloride (APTAC) and methacrylamidopropyltrimethylammonium chloride (MAPTAC); and/or
   at least one monomer selected from the group consisting of acrylic acid, methacrylic acid, itaconic acid, crotonic acid, maleic acid, fumaric acid, 2-acrylamido2-methylpropanesulfonic acid, vinylsulfonic acid, vinylphosphonic acid, allylsulfonic acid, allylphosphonic acid, styrenesulfonic acid, the water-soluble salts of an alkali metal, of an alkaline-earth metal or of ammonium of these monomers.

* * * * *